United States Patent [19]
Pedain et al.

[11] Patent Number: 4,727,128
[45] Date of Patent: Feb. 23, 1988

[54] DIISOCYANATES CONTAINING URETHANE GROUPS, A PROCESS FOR THEIR PREPARATION AND THEIR USE AS BINDERS OR BINDER COMPONENT IN POLYURETHANE LACQUERS

[75] Inventors: Josef Pedain; Bernd Riberi, both of Cologne; Michael Sonntag, Odenthal; Klaus König, Leverkusen; Jürg Fröhlich, Burscheid, all of Fed. Rep. of Germany

[73] Assignee: Bayer Aktiengesellschaft, Leverkusen, Fed. Rep. of Germany

[21] Appl. No.: 820,057

[22] Filed: Jan. 21, 1986

[30] Foreign Application Priority Data

Jan. 24, 1985 [DE] Fed. Rep. of Germany ....... 3502265

[51] Int. Cl.$^4$ .................... C07C 125/07; C08G 18/80; C08G 18/78
[52] U.S. Cl. ...................... 528/45; 524/872; 524/873; 528/65; 528/66; 560/158
[58] Field of Search .................. 560/158; 528/45, 65, 528/66; 524/476, 484, 872, 873

[56] References Cited

U.S. PATENT DOCUMENTS

| 3,634,306 | 1/1972 | Schroeder et al. | 524/476 |
| 3,635,848 | 1/1972 | Rambosek | 528/65 |
| 4,098,773 | 7/1978 | Illers et al. | 528/65 |
| 4,169,175 | 9/1979 | Marans et al. | 528/66 |

FOREIGN PATENT DOCUMENTS 0155559 9/1985 European Pat. Off. .

OTHER PUBLICATIONS

Translation of Kunststoff-Handbuch, Becker & Braun, Carl Hanser Verlag, Munich, (1983), vol. 7, "Polyurethane", 2nd Edition, pp. 77–79.

Primary Examiner—Veronica P. Hoke
Attorney, Agent, or Firm—Gene Harsh; Joseph C. Gil; Thomas W. Roy

[57] ABSTRACT

The present invention is directed to a process for the preparation of a diisocyanate by reacting a diisocyanate with 2,2,4-trimethyl-pentanediol-(1,3) or reaction products of this diol which contain either ether or ester groups and optionally other diols or triols. The present invention is additionally directed to the diisocyanates produced by this process and to their use in one-component and two-component coating compositions.

7 Claims, No Drawings

DIISOCYANATES CONTAINING URETHANE GROUPS, A PROCESS FOR THEIR PREPARATION AND THEIR USE AS BINDERS OR BINDER COMPONENT IN POLYURETHANE LACQUERS

BACKGROUND OF THE INVENTION

1. Field of the Invention

This invention relates to new diisocyanates which contain urethane groups and are soluble in hydrocarbon solvents, a process for their preparation and their use as binders or binder component in one-component or two-component polyurethane lacquers.

2. Description of the Prior Art

Polyisocyanates which contain urethane groups and are based on aromatic or aliphatic diisocyanates and low molecular weight polyhydric alcohols constitute an important group of polyisocyanates used in lacquer technology (see Kunststoff-Handbuch by G. W. Becker and D. Braun, Carl Hanser Verlag, Munich (1983), Volume 7, "Polyurethane", 2nd Edition, in particular Chapter 3.3.2.1).

The advantage of such polyisocyanates containing urethane groups compared with the monomeric diisocyanates on which they are based is that they are not volatile and are therefore easier and safer to handle. They are generally prepared by reacting low molecular weight polyols such as glycerol, trimethylolpropane, hexanetriol and/or pentaerythritol, optionally in admixture with diols, with excess quantities of simple diisocyanates such as 2,4-diisocyanatotoluene, 1-isocyanato-3,3,5-trimethyl-5-isocyanatomethylcyclohexane (isophorone diisocyanate, abbreviated IPDI) or 1,6-diisocyanatohexane. The reaction is accompanied by urethane formation and, subsequently, the excess, unreacted starting diisocyanate is removed by distillation. The polyisocyanates containing urethane groups are generally resinous substances used as solutions in solvents. The solvents are generally polar solvents such as esters of acetic acid, e.g. ethyl acetate or ethyl glycol acetate, optionally in admixture with solvents which are only slightly polar such as hydrocarbons. It is generally not possible to use hydrocarbons alone as solvents since the solutions obtained become very cloudy when left to stand or when diluted to the working concentration and, therefore, become unusable. Many polyester polyols and alkyd resins which may be used as potential co-reactants for lacquer polyisocyanates in two-component polyurethane lacquers are in practice also used as solutions in hydrocarbon solvents, but due to the poor solubility or incompatibility of the above-mentioned state of the art lacquer polyisocyanates with hydrocarbon solvents, the solutions frequently become cloudy or precipitates form when the polyol components dissolved in hydrocarbon solvents are mixed with solutions of the lacquer polyisocyanates, even if the polyisocyanate component was previously dissolved in a mixture of polar and apolar solvents. Such cloudiness and formation of precipitates reduce the gloss and damage the surface of coatings produced from the lacquers.

The consequent necessity to use polar solvents, in particular ester-based polar solvents, in the two-component polyurethane lacquers known in the art has the further disadvantage that polar solvents such as the esters of acetic acid which are most commonly used, are retained for a long time in small quantities in the hardened lacquer film. If lacquers are used externally and therefore exposed to the weather, these esters undergo hydrolysis, and the acetic acid formed has two very disadvantageous effects, i.e., it catalyzes the degradation of the lacquer film and in lacquers applied to metal, it reduces the corrosion protection provided by the lacquer. Both these factors reduce the life of the lacquer coat.

It was therefore an object of the present invention to provide lacquer polyisocyanates which form clear solutions in aromatic hydrocarbons which are only slightly polar, and to provide solutions which could be further diluted to the required working concentration by means of apolar solvents such as aromatic or aliphatic hydrocarbons. It is also an object to provide diisocyanates which have a lower inherent viscosity than related prior art polyisocyanates and, thus, may be used in the known applications for these polyisocyanates at higher solids contents.

These problems were able to be solved by the diisocyanates containing urethane groups according to the invention described below and the process according to the invention for the preparation of these diisocyanates which is also described below.

SUMMARY OF THE INVENTION

The present invention relates to diisocyanates corresponding to the formula

optionally in admixture with up to about 90% by weight, preferably up to about 50% by weight, based on the total weight, of urethane group-containing polyisocyanates corresponding to the formula

and optionally minor quantities of oligomeric polyisocyanates containing urethane groups.

In these formulae, $R^1$ represents a group of the formula

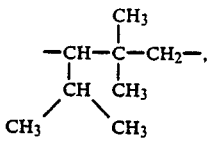

$R^2$ represents groups of the formula $-CH_2-CH_2-$,

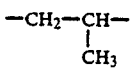

or $-CO-(CH_2)_5-$, $R^3$ represents a difunctional hydrocarbon group which links the isocyanate groups of an organic diisocyanate having a molecular weight of 140 to 336, this hydrocarbon group optionally containing ester groups, $R^4$ represents an m-valent aliphatic hydrocarbon group with 2 to 10 carbon atoms which is different from $R^1$ and optionally contains ether groups, m represents 2 or 3 and n represents 0, 1 or 2.

The invention also relates to a process for the preparation of these diisocyanates according to the invention, characterized in that diisocyanates corresponding to the formula $$R^3(NCO)_2$$

are reacted with dihydric alcohols of the formula $$R^1\text{-}[O\text{-}(R^2\text{-}O\text{-})_nH]_2$$

or with mixtures of these alcohols and alcohols of the formula $$R^4(OH)_m$$

in an NCO/OH equivalent ratio of about 1.7:1 to 15:1 to form urethane groups, any starting diisocyanate still present at the end of the reaction being optionally removed down to a residue of at most 2%, based on the quantity of polyisocyanates containing urethane groups, wherein $R^1$, $R^2$, $R^3$, $R^4$, m and n having the meanings indicated above.

The invention also relates to the use of the diisocyanates according to the invention or of mixtures of diisocyanates according to the invention with polyisocyanates, optionally masked with masking agents for isocyanate groups, and optionally in admixture with other, optionally masked polyisocyanates, as binders or binder components in one-component or two-component polyurethane lacquers.

DETAILED DESCRIPTION OF THE INVENTION

The following starting materials are used in the process according to the invention:

1. Diisocyanates corresponding to the general formula $$R^3(NCO)_2$$

wherein $R^3$ has the meaning already indicated and preferably stands for a divalent aromatic hydrocarbon group with a total of 6 to 15 carbon atoms which is optionally alkyl-substituted and/or optionally contains methylene bridges; a divalent saturated aliphatic hydrocarbon group with a total of 4 to 18 carbon atoms optionally containing ester groups; a cycloaliphatic hydrocarbon group with a total of 6 to 15 carbon atoms which is optionally alkyl-substituted and/or optionally contains methylene bridges; an aliphatic-cycloaliphatic hydrocarbon group with a total of 7 to 15 carbon atoms optionally containing alkyl substituents; or a xylylene group. The terms "aromatic," "aliphatic," "cycloaliphatic" and "aliphatic-cycloaliphatic" apply to the nature of the carbon atoms which are attached to the isocyanate groups.

The group $R^3$ is most preferably a hydrocarbon group linking the isocyanate groups of 1,6-diisocyanatohexane, isophorone diisocyanate or 2,4- or 2,6-diisocyanatotoluene. Any mixtures of suitable diisocyanates may also be used as starting materials.

The following are examples of suitable starting diisocyanates: 1,4-diisocyanatobutane, 1,5-diisocyanatopentane, 1,6-diisocyanatohexane, 1,8-diisocyanatooctane, 1,10-diisocyanatodecane, 1,12-diisocyanatododecane, isomeric mixtures of 2,2,4-trimethyl-1,6-diisocyanatohexane and 2,4,4-trimethyl-1,6-diisocyanatohexane, 2-methyl-1,5-diisocyanatopentane, 2,2-dimethyldiisocyanatopentane, ω-isocyanato-caproic acid-(2-isocyanatoethyl)-ester, α,ω-diisocyanatocaproic acid ethyl ester, 1,4- and 1,3-diisocyanatocyclohexane, 1-isocyanato-3,3,5-trimethyl-5-isocyanatomethylcyclohexane, 1,4- and 1,3-diisocyanatomethylcyclohexane, 2,4- and 4,4'-diisocyanatodicyclohexylmethane, 4,4'-diisocyanatodicyclohexylpropane-(2,2), 1,3- and 1,4-diisocyanatobenzene, 2,4-diisocyanatotoluene, 2,6-diisocyanatotoluene, 2,4- and 4,4'-diisocyanatodiphenylmethane, 4,4'-diisocyanatodiphenylpropane-(2,2), 1,3- and 1,4-xylylenediisocyanate or α,α,α',α'-tetramethyl-m- or p-xylylenediisocyanate, naphthylene-1,5-diisocyanate and mixtures of these compounds. 2,4-diisocyanatoluene, its commercial mixtures with 2,6-diisocyanatotoluene, 1,6-diisocyanatohexane and isophorone diisocyanate are particularly preferred as starting materials for the process according to the invention. The commercial mixtures of 2,4- and 2,6-diisocyanatotoluene are particularly preferred.

2. Aliphatic diols corresponding to the general formula $$R^1\text{-}[O\text{-}(R^2\text{-}O\text{-})_nH]_2$$

wherein $R^1$, $R^2$ and n have the meanings already indicated.

Diols corresponding to the above general formula in which n is 0 are particularly preferred.

Typical examples of such alcohols include the particularly preferred 2,2,4-trimethyl-pentanediol-(1,3), its ether group-containing ethoxylation and/or propoxylation products which may contain (as statistical average) up to four ether oxygen atoms per molecule, and its ester group-containing addition compounds with up to 4 mols of ε-caprolactone per mol of non-esterified diol.

3. The dihydric alcohols mentioned under 2. may optionally be used in the process according to the invention as mixtures with polyhydric alcohols corresponding to the formula $$R^4(OH)_m$$

wherein $R^4$ and m have the meanings already indicated.

The following are examples of such polyhydric alcohols: 1,2-dihydroxyethane, 1,2- and 1,3-dihydroxypropane, 1,2-, 2,3-, 1,3- and 1,4-dihydroxybutane, 1,6-dihydroxyhexane, neopentylglycol, 1,1,1-tris(hydroxymethyl)-propane, (trimethylolpropane), glycerol, and ethoxylation and/or propoxylation products of the above-mentioned simple polyhydric alcohols of the type conforming to the above definition for $R^4$. Any mixtures of such alcohols may, of course, also be used.

The polyhydric alcohols mentioned under 3., if used at all in the process according to the invention, are used in such quantities that mixtures of the type mentioned above are obtained as products of the process. The polyhydric alcohols mentioned under 3. are generally used in quantities of up to 300 mol %, preferably up to 100 mol %, based on the diols mentioned under 2., which are essential to the invention.

To carry out the process according to the invention, the diisocyanates exemplified under 1. are reacted with the diols exemplified under 2. and optionally with the polyhydric alcohols mentioned under 3., at temperatures of about 0° C. to 150° C., preferably about 40° C. to 120° C., and in proportions corresponding to an equivalent ratio of isocyanate groups to hydroxyl groups in the range of about 1.7:1 to 15:1, preferably about 3:1 to 8:1, so that urethane formation takes place. The diols exemplified under 2. and optionally the polyhydric alcohols mentioned under 3. are preferably added to the diisocyanate. The reaction is preferably carried out without any catalyst especially without any catalyst for the trimerization of isocyanate groups. The reaction may be accompanied by the formation of minor quantities of oligomeric, i.e. chain-lengthened polyisocyanates containing urethane groups, especially if the NCO/OH equivalent ratio is within the lower portion of the range indicated above. These polyisocyanates are then also present in admixture with the diisocyanates according to the invention but they do not impair the usefulness of the end products. Their proportion, based on the total weight of end product freed from excess monomeric starting diisocyanate, is generally below about 30 and preferably below about 20% by weight. Any excess monomeric starting diisocyanate present at the end of this reaction may be removed down to a residual monomeric diisocyanate content of at the most 2% by weight, preferably not more than 1% by weight, in the urethane group-containing reaction product, generally by thin layer distillation (for example using a thin layer evaporator) or by extraction (for example using n-hexane as the extracting agent). The preferred diisocyanates resp. polyisocyanate compositions of the invention are, therefore, characterized by a content of starting diisocyanates $R^3(NCO)_2$, based on the total amount of urethane-modified polyisocyanates of at most 2% by weight, preferably of at most 1% by weight.

The urethane group-containing lacquer polyisocyanates according to the invention form clear solutions in hydrocarbons such as benzene, toluene, xylene or other alkyl benzenes and can be diluted with these solvents. They also have a solubilizing action so that they may be used together with polyisocyanates which are not normally soluble, i.e. cannot be diluted with aromatic hydrocarbons, and such a mixture is then also soluble in aromatic hydrocarbons and can be diluted with them without cloudiness. It is thus found that not only the pure urethane group-containing diisocyanates according to the invention, but also mixtures thereof with diisocyanates corresponding to the formula

are soluble in and dilutable with the aromatic hydrocarbons exemplified above. This solubility and dilutability with aromatic hydrocarbons is only slightly reduced if the isocyanate groups are masked. Suitable masking agents for the diisocyanates according to the invention and their mixtures with polyisocyanates of the last mentioned general formula include monophenols such as phenol, the cresols, trimethylphenols and tert.-butyl phenols; tertiary alcohols such as tert.-butanol, tert.-amyl alcohol and dimethylphenylcarbinol; compounds which readily form enols such as ethylacetoacetate and acetylacetone; malonic acid derivatives such as malonic acid diesters containing 1 to 8 carbon atoms in the alcohol moiety; secondary aromatic amines such as N-methylaniline, N-methyltoluidine, N-phenyltoluidine and N-phenylxylidine; imides such as succinimide; lactams such as ε-caprolactam and δ-valerolactam; oximes such as butanoneoxime and cyclohexanoneoxime; mercaptans such as methyl mercaptan, ethyl mercaptan, butyl mercaptan, 2-mercaptobenzothiazole, α-naphthylmercaptan and dodecylmercaptan; and triazoles such as 1H-1,2,4-triazole. The diisocyanates according to the invention are valuable binders and binder components for one-component and two-component polyurethane lacquers by virtue of their excellent solubility in aromatic hydrocarbons.

By "one-component polyurethane lacquers" are meant in this context both moisture hardening coating compounds based on isocyanate prepolymers and heat-hardenable coating compounds based on compounds which contain isocyanate-reactive groups (which are optionally masked) and polyisocyanates containing masked isocyanate groups. For the production of moisture hardening coating compounds, the diisocyanates according to the invention, optionally present as mixtures with other isocyanates, may be used as isocyanate components for the preparation of isocyanate prepolymers or as cross-linking agents mixed with isocyanate-terminated prepolymers based on other organic polyisocyanates. For heat hardenable coating compounds, the diisocyanates according to the invention may be used in a masked form as the isocyanate component or as part of the isocyanate component.

By "two-component polyurethane lacquers" are meant in this context those coating compounds in which the binder is composed of a polyisocyanate component containing free isocyanate groups and an isocyanate-reactive component, preferably a polyol component, the diisocyanates according to the invention forming the polyisocyanate component or part of the polyisocyanate component.

All these basically known types of lacquers are preferably prepared and used in the form of solvent-containing coating compounds.

In the preferred one-component lacquers, the essential binder component is generally based on a relatively high molecular weight prepolymer containing free isocyanate groups, which prepolymer is based on (a) simple diisocyanates of the type exemplified above under 1. and (b) subequivalent quantities of relatively high molecular weight polyhydroxyl compounds. These relatively high molecular weight polyhydroxyl compounds are generally polyester or polyether polyols in the molecular weight range of about 500 to 4000 generally having an average functionality from 2 to 4. Polyether polyols within the above-mentioned molecular weight range containing tertiary nitrogen atoms are particularly suitable. These may be prepared, for example, by the propoxylation of suitable starter molecules containing primary or secondary amino groups. A suitable polyether polyol, for example, may thus be obtained by the propoxylation of ethylene diamine.

Apart from this essential binder component, the aforesaid one-component lacquers generally also contain low molecular weight lacquer polyisocyanates since the required mechanical properties can only be obtained in the hardened lacquer coat if these are also used in the one-component binder. The low molecular weight polyisocyanates hitherto used for this purpose include, for example, urethane group-containing polyisocyanates such as the reaction product of 3 mols of 2,4-diisocyanatotoluene and 1 mol of trimethylolpropane, but the use of the urethane group-containing diisocyanates according to the present invention or of their above-mentioned mixtures with urethane group-containing polyisocyanates of the formula

instead of the comparatively low molecular weight lacquer polyisocyanates hitherto used in one-component lacquers has opened up the possibility of obtaining one-component lacquers which are virtually infinitely dilutable with aromatic solvents.

Exceptionally low viscosity, highly concentrated moisture hardening one-component lacquers may be obtained by these means. At the same time, moisture hardening one-component lacquers which are soluble in aromatic hydrocarbons and can be applied from aromatic solution are also obtained by reacting the diisocyanates according to the invention with the relatively high molecular weight polyhydroxyl compounds exemplified above.

By using the diisocyanates according to the invention or their above-mentioned mixtures with polyisocyanates of the last mentioned general formula in "two-component lacquers" instead of or in combination with the lacquer polyisocyanates hitherto used for this purpose or by using the corresponding masked polyisocyanates in heat curable one-component lacquers, these types of lacquers can also be diluted with or applied from aromatic solvents. It should be particularly noted that, as already indicated above, it is in many cases sufficient to replace only a proportion of the polyisocyanate component in the known two-component lacquers by the diisocyanates or polyisocyanate mixtures according to the invention in order to achieve the above-mentioned effect since the diisocyanates according to the invention frequently have a solubilizing effect on the lacquer polyisocyanates which would otherwise not form clear solutions in aromatic solvents.

Apart from the above-mentioned partial or complete replacement of the previously used lacquer polyisocyanates by the products according to the invention, the diisocyanates and polyisocyanate mixtures according to the invention are used together with known starting materials and auxiliary agents, for which information may be found in the literature of the relevant state of the art (see e.g. H. Kittel-Lehrbuch der Lacke und Beschichtungen, Volume III, publishers W. A. Colomb 1976). It should be noted in this context that, particularly in two-component lacquers, the diisocyanates and polyisocyanate mixtures according to the invention may be combined not only with the polyester and polyether polyols exemplified above but also with the polyhydroxypolyacrylates known in the chemistry of polyurethane lacquers. Low molecular weight polyhydric alcohols, with molecular weights below 500, may form part of the polyol component of such two-component lacquers.

Both the above-mentioned two-component lacquers and heat hardenable one-component lacquers preferably contain the polyisocyanate component and the isocyanate-reactive component, preferably the polyol component in quantities corresponding to about 0.8 to 3, preferably about 0.9 to 1.1 isocyanate-reactive groups, preferably hydroxyl groups for every free or masked isocyanate group. The diisocyanates or polyisocyanate mixtures according to the invention could, in principle, also be used in lacquer systems containing aminic chain lengthening agents as isocyanate-reactive compounds, optionally in addition to hydroxyl compounds of the type exemplified above. These aminic chain lengthening agents are generally masked polyamines, e.g. polyketimines or oxazolidines, which form free amino groups under the influence of atmospheric moisture. When compounds of this kind containing isocyanate-reactive groups are used, the same equivalent ratios should be observed as indicated above, and the (masked) amino groups may partly or completely replace the hydroxyl groups.

The lacquers containing the diisocyanates or polyisocyanate mixtures according to the invention as binder components are particularly suitable for lacquering wood but they are also suitable for application on metallic substrates. The lacquer films obtained are not discolored by heat and they have excellent abrasion resistance as well as being distinguished by their great hardness, elasticity, chemical resistance and high gloss.

In the following Examples, "percentages" given are percentages by weight and all the figures given in "parts" denote parts by weight.

EXAMPLES

EXAMPLE 1 (Example of preparation)

4002 g of diisocyanatotoluene (mixture of 2,4- and 2,6-isomers in the ratio of 4:1) were heated to 60° C. A mixture of 134 g of trimethylolpropane and 341.8 g of 2,2,4-trimethylpentane-1,3-diol was introduced into this diisocyanate and the temperature was raised to 100° C. within 2 to 3 hours. After that time, the isocyanate content remained constant. The crude product was freed from excess monomeric diisocyanate by distillation in a thin layer distillation apparatus at 150° C./0.1 mm. 1750 g of a viscous resin was obtained as residue, which was dissolved in anhydrous xylene to form a 75% solution. The clear solution had an isocyanate content of 13.4%, a color number APHA of 30 (DIN 53 409) and a residual free diisocyanate content of 0.1%.

The viscosity of the solution was 2300 mPas/23° C. and the solution could be diluted in any proportions with xylene, toluene or alkylbenzene mixtures.

Gel chromatographic analysis showed that the solids content of this solution was composed of about 55.5% of the adduct according to the invention of 1 mol of 2,2,4-trimethylpentane-1,3-diol and 2 mol of tolylene diisocyanate, about 29.3% of the adduct of 1 mol of trimethylolpropane and 3 mol of tolylene diisocyanate, and about 15.2% of higher molecular weight constituents.

EXAMPLE 2 (Example of use)

This example illustrates the preparation of a two-component lacquer which was soluble in xylene and satisfied all of the requirements of a high quality furniture lacquer.

The polyol component used in an alkyd resin prepared by the usual method of solvent-free condensation of 298 parts of ground nut fatty acid, 350 parts of phthalic acid anhydride, 7 parts of maleic acid anhydride, 88 parts of triethylene glycol and 320 parts of trimethylolpropane. This resin was dissolved to form a 70% solution in xylene. The solution obtained had a hydroxyl number of 93 and an acid number of 15.

100 parts of the polyol solution were mixed with 57 parts of the polyisocyanate solution from Example 1 and diluted to a working viscosity with 53 parts of xylene. The pot life of the clear lacquer prepared as described above was 56 hours.

Properties of the lacquer film:

The tests were carried out on films which had been applied to metal with a 210 μm dumb-bell coating roller system.

| (1) | Resistance of film to attack by solvent after 14 days (Exposure time 1 minute) | Xylene | Ethyl-glycol acetate | Ethyl acetate | Acetone | Super grade petrol |
|---|---|---|---|---|---|---|
| 0 = film completely unchanged | | 0 | 0 | 1 | 2 | 0 |
| 4 = film dissolved | | | | | | |
| (2) | Pendulum hardness according to Konig (DIN 53 157) | after 24 h 110 | 3 d 161 | 7 d 183 | 14 d 195 | |
| (3) | Erichsen cupping (DIN 53 156) at layer thickness 47–55μ | 6 | 7 | 5.1 | 4.8 | |
| (4) | Mandrel bending test (according to DIN 53 152) | 32–8 in order, broken off from 6 onwards (51μ) | | | | |

The clear lacquer described is particularly suitable for lacquering wood (furniture).

EXAMPLES 3 TO 17 (Examples of preparation)

Examples 3 to 17 are summarized in the Table below. Examples 3 to 13 are examples according to the invention, Examples 14 to 17 are comparison examples.

The method of preparation used for the reaction products listed in the Table was completely analogous to that described in Example 1: reaction of the polyols with excess diisocyanate, removal by thin layer distillation of the excess diisocyanate not consumed in the reaction, followed by forming a solution of the distillation residue.

The following diisocyanates were used:
HDI: 1,6-diisocyanatohexane;
IPDI: isophorone diisocyanate;
TDI: 2,4- and 2,6-diisocyanatotoluene in proportions by weight of 4:1.

As may be seen from the data in the Table, the products of Examples 14 to 17 were not soluble in xylene or toluene and even their solutions in polar solvents can only be very slightly diluted with these hydrocarbons. The products according to the invention, on the other hand, were soluble in hydrocarbons of the type mentioned and could be diluted with them. Solids concentrations satisfying any, even extreme, requirements could be obtained (the dilutability indicated refers to the solids content obtainable).

TABLE

| Example | Mol | Diisocyanate | Mol of trimethyl-pentane-1,3-diol | Mol of trimethylol-propane | Mol of neopentyl glycol | Mol of diethylene glycol | Solvent | Conc. of solution (%) | NCO content of solution (%) |
|---|---|---|---|---|---|---|---|---|---|
| 3 | 6 | HDI | 1 | | | | — | 100 | 15.3 |
| 4 | 6 | TDI | 1 | | | | xylene | 75 | 12.8 |
| 5 | 6 | IPDI | 1 | | | | " | 75 | 10.0 |
| 6 | 6 | TDI | 0.5 | | 0.5 | | butyl acetate | 75 | 12.9 |
| 7 | 8 | TDI | 0.7 | 0.3 | | | xylene | 75 | 12.8 |
| 8 | 6 | IPDI | 0.61 | 0.26 | | | " | 75 | 10.8 |
| 9 | 6 | TDI | 0.3 | 0.25 | 0.3 | | " | 75 | 13.5 |
| 10 | 6 | TDI | 0.4 | 0.2 | 0.3 | | " | 75 | 13.65 |
| 11 | 6 | TDI | 0.325 | 0.25 | | 0.3 | " | 75 | 13.5 |
| 12 | 9 | TDI | 0.325 | 0.25 | | 0.3 | " | 75 | 14 |
| 13 | 6 | IPDI | 0.3 | 0.25 | 0.3 | | " | 75 | 10.8 |
| 14 | 6 | TDI | | | 1 | | butyl acetate | 75 | 13.3 |
| 15 | 6 | TDI | | 0.26 | 0.61 | | butyl acetate | 75 | 13.2 |
| 16 | 6 | TDI | | 0.52 | | 0.22 | butyl acetate | 75 | 13.7 |
| 17 | 6 | TDI | | 0.52 | 0.22 | | butyl acetate | 75 | 13.8 |

| Example No. | Viscosity of solution (mPas) | Residual diisocyanate (%) | Dilutability with xylene/toluene | Remarks |
|---|---|---|---|---|
| 3 | 6300 | 0.03 | to below 1% | This product could also be diluted with a mixture of alkylbenzenes |
| 4 | 900 | 0.07 | to below 5% | also dilutable with a mixture of alkylbenzenes |
| 5 | 3200 | 0.20 | to below 1% | also dilutable with a mixture of alkylbenzenes or petroleum hydrocarbons |
| 6 | 830 | 0.15 | to below 1% | |
| 7 | 6000 | 0.13 | to below 1% | also dilutable with a mixture of alkylbenzenes |
| 8 | 6200 | 0.4 | to below 1% | dilutable with petroleum hydrocarbons and a mixture of alkylbenzenes |
| 9 | 2000 | 0.44 | to below 15% | |
| 10 | 2200 | 0.05 | to below 15% | |
| 11 | 1600 | 0.08 | to below 15% | |
| 12 | 1600 | 0.07 | to below 10% | |
| 13 | 4200 | 0.28 | to below 5% | |
| 14 | 1300 | 0.13 | only to about 40% | product not soluble in xylene or toluene but precipitates |
| 15 | 5500 | 0.11 | only to about 67% | product insoluble in pure xylene and |

| 16 | 2300 | 0.09 | only to about 60% | toluene product insoluble in pure xylene or toluene |
| 17 | 2500 | 0.12 | only to about 60% | product insoluble in pure xylene or toluene |

EXAMPLE 18 (Use)

This example describes the preparation and properties of a moisture hardening one-component lacquer which may be prepared and transported as a highly concentrated solution in xylene as the only solvent and can be diluted at the site to the required working concentration with xylene or other hydrocarbons.

The relatively high molecular weight prepolymer containing free isocyanate groups required for preparing the one-component lacquer was prepared as follows:

7400 g of a polyether polyol with a hydroxyl number of 61 prepared by the propoxylation of ethylene diamine was mixed with 1330 g of 2,4-diisocyanatotoluene and the mixture was reacted for 3 hours at 60° to 80° C. The resulting polyether prepolymer containing isocyanate groups was dissolved to a concentration of 75% in xylene.

944 g of the prepolymer solution were then mixed with 1465 g of the polyisocyanate solution according to the invention described in Example 7, and 130 g of xylene were added to the mixture. A clear, only slightly yellowish solution in xylene of a moisture hardening one-component lacquer at a concentration of about 70% was obtained.

Isocyanate content: 7.8%
Viscosity at 23° C.: 500 mPas
Dilutability with xylene: <10%
Dilutability with commerical alkyl benzene mixture: <10%
Color Number (DIN 1662): 1.

PROPERTIES OF THE LACQUER

The lacquer was diluted to a working concentration of 45% with xylene, 0.5% of dibutyl tin dilaurate was added as catalyst, and the lacquer was applied to glass plates, using a dumb-bell lacquer roller system (width of gap 0.12 mm).

Properties:
Sand dry (DIN 53 150): 2 hours
Pendulum hardness according to König (DIN 53 157): 150 after 24 hours
Resistance to solution by solvent after 24 hours (Exposure time 1 minute):

| Xylene | Ethyl glycol acetate | Ethyl acetate | Acetone | Super grade petrol |
|---|---|---|---|---|
| 0 | 0 | 0 | 1 | 0 |

0 = film completely unchanged
↓
4 = film dissolves

Abrasion according to DIN 53 109 (CS 10/1000 U/10N): 20 mg.

These properties show that the products according to the invention may be used to produce a high quality one-component PUR lacquer which can be worked up in an aromatic hydrocarbon as the only solvent. It is particularly advantageous that the possibility of using this solvent alone enables blister-free top coat lacquers to be obtained in a thickness of about 1 mm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A diisocyanate corresponding to the formula $$R^1\text{+O+}R^2\text{—O+}_n\text{CO—NH—}R^3\text{—NCO}]_2$$

optionally in admixture with up to about 90% by weight, based on the total weight, of polyisocyanates containing urethane groups corresponding to the formula $$R^4\text{+O—CO—NH—}R^3\text{—NCO})_m$$

and optionally minor quantities of oligomeric polyisocyanates containing urethane groups, wherein $R^1$ represents a group of the formula

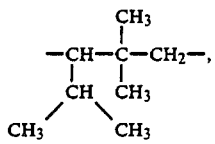

$R^2$ represents a group of the formula —CH$_2$—CH$_2$—,

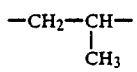

or —CO—(CH$_2$)$_5$—, $R^3$ represents a difunctional hydrocarbon group optionally containing ester groups and linking the isocyanate groups of an organic diisocyanate having a molecular weight of from 132 to 336, $R^4$ represents an m-valent aliphatic hydrocarbon group with 2 to 10 carbon atoms optionally containing ether groups and different from $R^1$, m represents 2 or 3 and n represents 0, 1 or 2.

2. The diisocyanate of claim 1 wherein $R^3$ represents the hydrocarbon group linking the isocyanate groups of 1,6-diisocyanatohexane, 1-isocyanato-3,3,5-trimethyl-5-isocyanatomethyl-cyclohexane or 2,4- or 2,6-diisocyanatotoluene, and n is 0.

3. The diisocyanate of claim 1, characterized by a content of monomeric diisocyanate corresponding to the formula $$R^3(NCO)_2$$

of at most 2% by weight, based on the total amount of urethane-modified di- and polyisocyanates.

4. A moisture-hardening coating composition which is prepared by reacting a polyisocyanate comprising the diisocyanate of claim 1 with a compound containing isocyanate-reactive groups.

5. A moisture-hardening coating composition which comprises an isocyanate-terminated prepolymer based on a polyisocyanate other than the diisocyanate of claim 1 and as the cross-linking agent, the diisocyanate of claim 1.

6. A polyurethane-forming composition which comprises
   (a) a blocked polyisocyanate which comprises the diisocyanate of claim 1 in blocked form and
   (b) a compound containing isocyanate-reactive groups.

7. The composition of claim 6 wherein said compound containing isocyanate-reactive groups is a polyol.

* * * * *